United States Patent
Hara

(10) Patent No.: US 7,844,300 B2
(45) Date of Patent: Nov. 30, 2010

(54) METHOD FOR CONTROLLING THE TRANSFER OF SIGNALS BY A FIRST COMMUNICATION DEVICE TO A SECOND COMMUNICATION DEVICE THROUGH A WIRELESS NETWORK

(75) Inventor: Yoshitaka Hara, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 1110 days.

(21) Appl. No.: 11/507,498

(22) Filed: Aug. 22, 2006

(65) Prior Publication Data

US 2007/0060052 A1    Mar. 15, 2007

(30) Foreign Application Priority Data

Sep. 2, 2005     (EP)     ................. 05291821

(51) Int. Cl.
    *H04M 1/00*     (2006.01)
(52) U.S. Cl. .................. 455/562.1; 375/267; 375/347
(58) Field of Classification Search ................ 455/13.3, 455/562, 562.1
    See application file for complete search history.

(56) References Cited

U.S. PATENT DOCUMENTS

| | | | | |
|---|---|---|---|---|
| 6,600,776 | B1* | 7/2003 | Alamouti et al. ............. | 375/147 |
| 6,760,388 | B2* | 7/2004 | Ketchum et al. ............. | 375/295 |
| 2003/0153322 | A1* | 8/2003 | Burke et al. ................. | 455/450 |
| 2003/0181170 | A1 | 9/2003 | Sim | |
| 2003/0231700 | A1* | 12/2003 | Alamouti et al. ............. | 375/144 |
| 2003/0235255 | A1* | 12/2003 | Ketchum et al. ............. | 375/285 |
| 2004/0198452 | A1* | 10/2004 | Roy ........................ | 455/562.1 |
| 2004/0209579 | A1* | 10/2004 | Vaidyanathan ............... | 455/101 |
| 2005/0249304 | A1* | 11/2005 | Takano et al. ................. | 375/267 |
| 2006/0034163 | A1* | 2/2006 | Gore et al. .................... | 370/208 |
| 2006/0067277 | A1* | 3/2006 | Thomas et al. ............... | 370/334 |
| 2006/0135101 | A1* | 6/2006 | Binshtok et al. .......... | 455/232.1 |
| 2006/0274849 | A1* | 12/2006 | Ketchum et al. ............. | 375/267 |
| 2007/0041464 | A1* | 2/2007 | Kim et al. .................... | 375/267 |
| 2007/0047628 | A1* | 3/2007 | Fulghum et al. ............. | 375/148 |
| 2007/0104254 | A1* | 5/2007 | Bottomley et al. .......... | 375/148 |
| 2007/0105594 | A1* | 5/2007 | Burkert et al. ........... | 455/562.1 |
| 2007/0110172 | A1* | 5/2007 | Faulkner et al. ............. | 375/260 |
| 2007/0189409 | A1* | 8/2007 | Hottinen ..................... | 375/267 |

(Continued)

FOREIGN PATENT DOCUMENTS

WO     WO 2004/112279 A1     12/2004

*Primary Examiner*—Duc Nguyen
*Assistant Examiner*—Ajibola Akinyemi
(74) *Attorney, Agent, or Firm*—Oblon, Spivak, McClelland, Maier & Neustadt, L.L.P.

(57) ABSTRACT

The invention concerns a device for controlling the transfer of signals by a first communication device (20) to a second communication device (10) through a wireless network (15), the second communication device having at least N antennas, the first communication device having at least $M_k$ antennas. The device for controlling the transfer is included in the second communication device and comprises means for determining a weighting vector $v_k$, the weighting vector $v_k$ being composed of $M_k$ elements, each element of the weighting vector $v_k$ being expected to weight the signals transferred by the first communication device through an antenna of the first communication device, means for determining information related to the determined weighting vector $v_k$ and means for transferring to the first communication device at least a signal comprising or being modified by the information related to the determined weighting vector $v_k$. The invention concerns also the corresponding method.

22 Claims, 4 Drawing Sheets

U.S. PATENT DOCUMENTS

| | | |
|---|---|---|
| 2008/0008110 A1* | 1/2008 | Kishigami et al. .......... 370/310 |
| 2008/0019431 A1* | 1/2008 | Kwak et al. ................. 375/219 |
| 2008/0063045 A1* | 3/2008 | Cozzo et al. ................ 375/238 |
| 2008/0152033 A1* | 6/2008 | Gore et al. ................. 375/260 |
| 2008/0212722 A1* | 9/2008 | Heikkila ..................... 375/341 |
| 2008/0317158 A1* | 12/2008 | Ketchum et al. ............ 375/267 |
| 2009/0016263 A1* | 1/2009 | Kishigami et al. .......... 370/328 |
| 2009/0080495 A1* | 3/2009 | Kwak et al. ................. 375/130 |

* cited by examiner

METHOD FOR CONTROLLING THE TRANSFER OF SIGNALS BY A FIRST COMMUNICATION DEVICE TO A SECOND COMMUNICATION DEVICE THROUGH A WIRELESS NETWORK

The present invention relates generally to communication systems and in particular, to a method and apparatus for multi-antenna transmission within a communication system.

Telecommunication systems in which a plurality of antennas are used at a receiver end and/or at a transmitter end of a wireless link, are called Multiple Input Multiple Output systems (further referred to as MIMO systems). MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio and under favourable uncorrelated channel conditions.

Beamforming has been investigated for MIMO systems in order to optimize the range and performance of the wireless link between the receiver end and the transmitter end. Multiple-input multiple-output (MIMO) antenna scheme combining beamforming uses antenna signal processing at both ends of the wireless link to maximize the signal-to-noise (SNR) and/or signal-to-noise-plus-interference (SNIR), thereby improving the link margin between two communication devices.

Generally, the transmitter and the receiver ends have each a plurality of antennas. The transmitter transmits signals to the second communication device using a transmit weighting vector for transmission by each the plurality of antennas and the transmit signals are received by the plurality of antennas at the receiver. The receiver determines itself the suitable weighting vector for transmission of signals on the plurality of antennas back to the transmitter.

In case of a communication system wherein plural mobile terminals are linked to a base station, it is difficult sometime for the mobile terminals to determine the best weighting vector as far as it is not aware about the other mobile terminals which are linked to the base station and which may disturb its communication with the base station.

Furthermore, when a single mobile terminal is linked to a base station, or in a point to point communication, the mobile terminal is not aware if there is some other base stations and mobile terminals linked to them in the vicinity of the mobile terminal. Such unawareness of the communication condition on the wireless link limits the ability of a mobile terminal to determine the best weighting vector it has to apply to signals transferred through its antennas.

The aim of the invention is therefore to propose methods, devices and signal which permit to communication devices to determine the best weighting vectors in order to perform efficient beamforming.

To that end, the present invention concerns a method for controlling the transfer of signals by a first communication device to a second communication device through a wireless network, the second communication device having at least N antennas where N is equal or upper than two, the first communication device having at least $M_k$ antennas where $M_k$ is equal or upper than two. The method comprises the steps executed by the second communication device of:

determining a weighting vector $v_k$, where k is an indicia representative of the first communication device, the weighting vector being composed of $M_k$ elements, each element of the weighting vector being expected to weight the signals transferred by the first communication device through an antenna of the first communication device, determining information related to the determined weighting vector $v_k$, transferring to the first communication device through the wireless network at least a signal comprising or being weighted by the information related to the determined weighting vector $v_k$.

The present invention concerns also a device for controlling the transfer of signals by a first communication device to a second communication device through a wireless network, the second communication device having at least N antennas where N is equal or upper than two, the first communication device having at least $M_k$ antennas where $M_k$ is equal or upper than two. The device for controlling the transfer is included in the second communication device and comprises:

means for determining a weighting vector $v_k$, where k is an indicia representative of the first communication device, the weighting vector $v_k$ being composed of $M_k$ elements, each element of the weighting vector $v_k$ being expected to weight the signals transferred by the first communication device through an antenna of the first communication device, means for determining information related to the determined weighting vector $v_k$, means for transferring to the first communication device through the wireless network at least a signal comprising or being modified by the information related to the determined weighting vector $v_k$.

Thus, if the second communication device is aware of any other communication devices which may disturb the transfer of information between the first and the second communication devices, the determination of the weighting vector can be made considering these disturbances.

Furthermore, the second communication device can then control the weighting made by at least one first communication device on the signals transferred by the first communication device to the second communication device.

Such case is particularly effective when the first communication device is a mobile terminal and the second communication device is a base station.

According to a particular feature, the information related to the determined weighting vector $v_k$ is at least a second weighting vector $w_k$, where k is an indicia representative of the first communication device, the second weighting vector $w_k$ being composed of N elements, each element of the second weighting vector $w_k$ weighting the signals transferred through each antenna of the second communication device to the first communication device and the signals are pilot signals.

Thus, the quantity of information transferred from the second communication device to the first communication device is reduced.

According to a particular feature, the second weighting vector $w_k$ is equal to $w_k = b^*/\|b\|$, wherein $b = \sqrt{P_r} H^T v_k$, $b^*$ is the complex conjugate of the vector b, Pr is the power of a signal transferred by the first communication device to the second communication device and $H^T$ is the transpose of the channel response matrix H.

As $b = \sqrt{P_r} H^T v_k$, b is representative of the weighting vector $v_k$ each element of which weight the signals transferred by the first communication device through an antenna of the first communication device. The second communication device weights the signals transferred through each antenna of its antennas by a similar weighting vector as the one used by the first communication device.

According to a particular feature, the second communication device transfers through the wireless network plural pilot signals weighted by plural second weighting vectors $w_k$ defined as mutually orthogonal, and in that the pilot signals weighted by different second weighting vectors $w_k$ are mutually orthogonal.

Thus, by transferred plural pilots signals, the second communication device transfers all information which allows to a first communication device, or several communication devices to estimate the channel response matrix and/or determine the weighting vector $v_k$ from the received signal.

According to a particular feature, K first communication devices are linked to the second communication device, wherein K is equal or upper than two, the pilot signals are mutually orthogonal and weighted by different second weighting vectors $w_1$ to $w_K$ and the second weighting vectors $w_k$ for k=1 to K are equal to $w_k=(B^*B^T)^{-1}b^*_k/\|b_k\|$, wherein $B=[b_1/\|b_1\|, \ldots, b_K/\|b_K\|]$ is not a singular matrix, $b_k = \sqrt{P_r}H_k^T v_k$, Pr is the power of a signal transferred by the first k communication device to the second communication device, $H_k^T$ is the transpose of the channel response matrix related to the first k communication device.

Thus, the second communication device can control plural first communication devices enabling then the use of the present invention in, as example, space division multiple access scheme.

According to a particular feature, the signals weighted by the determined weighting vector $w_k$ are comprised in an instruction time slot.

According to a particular feature, the instruction time slot further comprises the first communication identifier and/or the modulation and coding scheme to be used by the first communication device.

Thus, the second communication device is able to transfer signals to a given first communication device and control in an efficient way the modulation and coding scheme to be used by the given first communication devices, as example according the condition of the wireless network.

The present invention concerns also a method for transferring signals from a first communication device to a second communication device through a wireless network, the second communication device having at least N antennas where N is equal or upper than two, the first communication device having at least $M_k$ antennas where $M_k$ is equal or upper than two. The method comprises the steps, executed by the first communication device, of:

receiving at least a signal from the second communication device through the $M_k$ antennas, determining from the at least one received signal a weighing vector $\tilde{v}_k$ composed of $M_k$ elements, weighting the signals transferred to the second communication device through each antenna of the first communication device by an element of the determined weighting vector $\tilde{v}_k$.

The present invention concerns also a device for transferring signals by a first communication device to a second communication device through a wireless network, the second communication device having at least N antennas where N is equal or upper than two, the first communication device having at least $M_k$ antennas where $M_k$ is equal or upper than two. The device for transferring signals is included in the first communication device and comprises:

means for receiving at least one signal from the second communication device through the $M_k$ antennas, means for determining from the at least one received signal a weighing vector $\tilde{v}_k$ composed of $M_k$ elements, means for weighting the signals transferred to the second communication device through each antenna of the first communication device by an element of the determined weighting vector $\tilde{v}_k$.

Thus, if the first communication device is not aware of any other communication devices which may disturb the transfer of information between the first and the second communication device, the determination of the weighting vector is still made considering these disturbances.

Furthermore, the determination, by the first communication device, of the weighting vector is simple.

Such case is particularly effective when the first communication device is a mobile terminal and the second communication device is a base station considering that a mobile terminal has less signal processing capabilities than a base station.

According to a particular feature, the signals received from the second communication device through the $M_k$ antennas are pilot signals.

According to a particular feature, the weighing vector $\tilde{v}_k$ is equal to $$\tilde{v}_k = \frac{\{(HH^H)^+ a\}^*}{\|\{(HH^H)^+ a\}^*\|},$$

where $^+$ is the Moor-Penrose generalized matrix inverse, a is the received vector by the first communication device, H is the channel response matrix $H^H$ is the complex conjugate transpose of the channel response matrix H.

Thus, the determination of the weighing vector $\tilde{v}_k$ is simple, the first communication device doesn't need to have important processing capabilities.

According to a particular feature, plural signals are received and are representative of a sequence of $p_0$ symbols and the determination of the weighing vector $\tilde{v}_k$ from the information related the weighting vector is decomposed into:

a calculation of a first matrix $$\tilde{A} = \frac{1}{p_0} XS^H,$$

$$X = [x(1), \ldots, x(p_0)],$$

$x(p)=[x_1(p), \ldots, x_{Mk}(p)]^T$ is the received vector signal of the p-th symbol, $$S = \begin{bmatrix} s_1(1) & \cdots & \cdots & \cdots & s_1(p_0) \\ \cdots & \cdots & \cdots & \cdots & \cdots \\ s_N(1) & \cdots & \cdots & \cdots & s_N(p_0) \end{bmatrix},$$

a calculation of a second matrix $\tilde{a}_k = 1/p_0 X s_k^H$ where $s_k=[s_k(1), \ldots, s_k(p_0)]$, a calculation of a weighing vector $$\tilde{v}_k = \frac{\{(\tilde{A}\tilde{A}^H)^+ \tilde{a}_k\}^*}{\|\{(\tilde{A}\tilde{A}^H)^+ \tilde{a}_k\}^*\|}.$$

Thus, a first communication device doesn't need to be aware of the channel response matrix H.

According to a particular feature, the weighted signals transferred are the pilots symbols received from the second communication device through the $M_k$ antennas and the weighted signals are transferred comprised in an identification time slot.

According to a particular feature, the identification time slot further comprises the first communication device identifier.

The present invention concerns also a signal for controlling the transfer of signals by a first communication device to a second communication device through a wireless network, the second communication device having at least N antennas where N is equal or upper than two, the first communication device having at least $M_k$ antennas where $M_k$ is equal or upper than two. The signal for controlling the transfer of signal is transferred by second communication device and comprises pilot symbols weighted by a weighting vector $w_k$ determined from a weighting vector $v_k$, where k is an indicia representative of the first communication device, the weighting vector $v_k$ being composed of $M_k$ elements, each element of the weighting vector $v_k$ being expected to weight the signals transferred by the first communication device through an antenna of the first communication device.

Since the features and advantages relating to the signal are the same as those set out above related to the method and device according to the invention, they will not be repeated here.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 1:
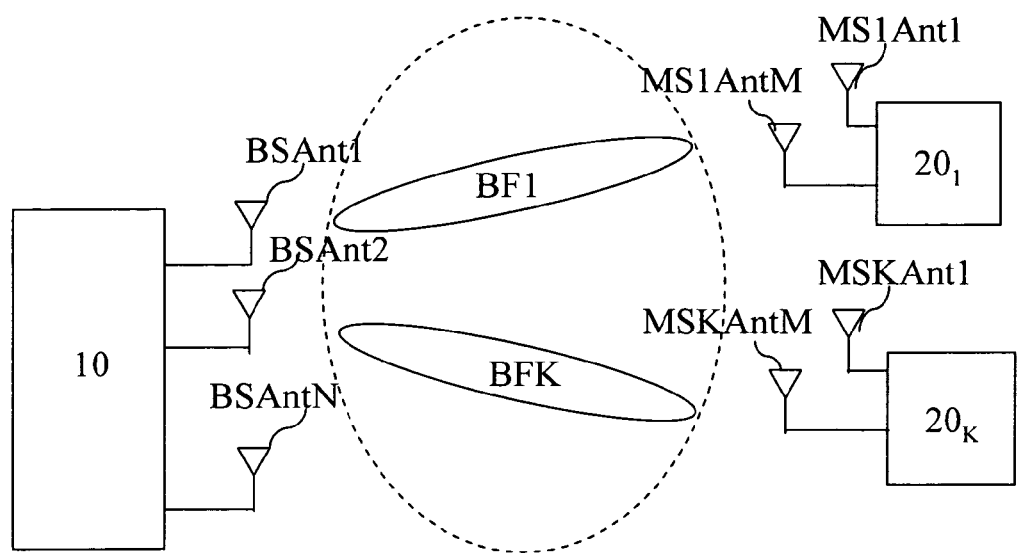
FIG. 1 is a diagram representing the architecture of the system according to the present invention.

In the system of the FIG. 1, a plurality of first communication devices $20_1$ to $20_K$ are linked through a wireless network 15 to a second communication station 10.

Preferably, and in a non limitative way, the first communication devices $20_1$ to $20_K$ are mobile terminals. The second communication device 10 is a base station 10.

The base station 10 has N antennas noted BSAnt1 to BAAntN. Each mobile terminal $20_1$ to $20_K$ has $M_k$ antennas noted respectively MSAnt1 to MSAntM and MSKAnt1 to MSKAntM. It has to be noted here that the number of $M_k$ antennas may vary according to the mobile terminals $20_1$ to $20_K$.

The base station 10 transfers signals to the mobile terminals $20_1$ to $20_K$ through a downlink channel and the mobile terminals $20_1$ to $20_K$ transfer signals to the base station 10 through an uplink channel.

When the system uses Time Division Duplexing scheme, the signals transferred in uplink and downlink channels are duplexed in different time periods of the same frequency band. The signals transferred within the wireless network 15 share the same frequency spectrum. The share spectrum is time divided using repeating frames having a fixed number of time slots. Each time slot is used to transmit either only uplink or downlink signals.

When the system uses Frequency Division Duplexing scheme, the signals transferred in uplink and downlink channels are duplexed in different frequency bands. The spectrum is divided into different frequency bands and the uplink and downlink signals are transmitted simultaneously.

The base station 10 transfers through the antennas BSAnt1 to BsAntN the signals to be transmitted to the mobile terminals $20_1$ to $20_K$. More precisely, when the base station 10 transmits a signal to a given mobile terminal $20_k$, the signal is N times duplicated and each duplicated signal is weighted, i.e. multiplied, by an element of a weighting vector obtained from an expected vector to be received from the given mobile terminal $20_k$. As a result, the base station 10 performs beamforming, i.e controls the spatial direction of the transmitted signal to each of the mobile terminals $20_1$ to $20_K$.

The ellipse noted BF1 in the FIG. 1 shows the pattern of the radiated signal by the antennas BSAnt1 to BSAntN transferred to the mobile terminal $20_1$ by the base station 10.

The ellipse noted BFK in the FIG. 1 shows the pattern of the radiated signal by the antennas BSAnt1 to BSAntN transferred to the mobile terminal $20_K$ by the base station 10.

In a similar way, each mobile terminal $20_1$ to $20_K$ transmits through its $M_k$ antennas, the signal to be transferred to the base station 10. More precisely, when a mobile terminal $20_k$ transmits a signal to the base station 10, the signal is $M_k$ times duplicated and each duplicated signal is weighted, i.e. multiplied, by an element of the weighting vector defined for the mobile terminal $20_k$, with k=1 to K. As a result, the mobile terminal $20_k$ performs beamforming, i.e controls the spatial direction of the transmitted signals to the base station 10.

The ellipse BF1 shows the pattern of the radiated signal by the antennas MS1Ant1 to MS1AntM transferred by the mobile terminal $20_1$ to the base station 10.

The ellipse BFK shows the pattern of the radiated signal by the antennas MSKAnt1 to MSKAntM transferred by the mobile terminal $20_K$ to the base station 10.

According to the invention, the base station 10 determines for each mobile terminal $20_1$ to $20_K$, the uplink weighting vector it has to use when it transfers signals to the base station 10 through the uplink channel.

Each mobile terminal $20_1$ to $20_K$ receives from the base station 10 a signal or plural signals through the downlink channel and calculates from the received signal or signals the uplink weighting vector it has to use when it transfers signals to the base station 10 through the uplink channel.

Figure 2:
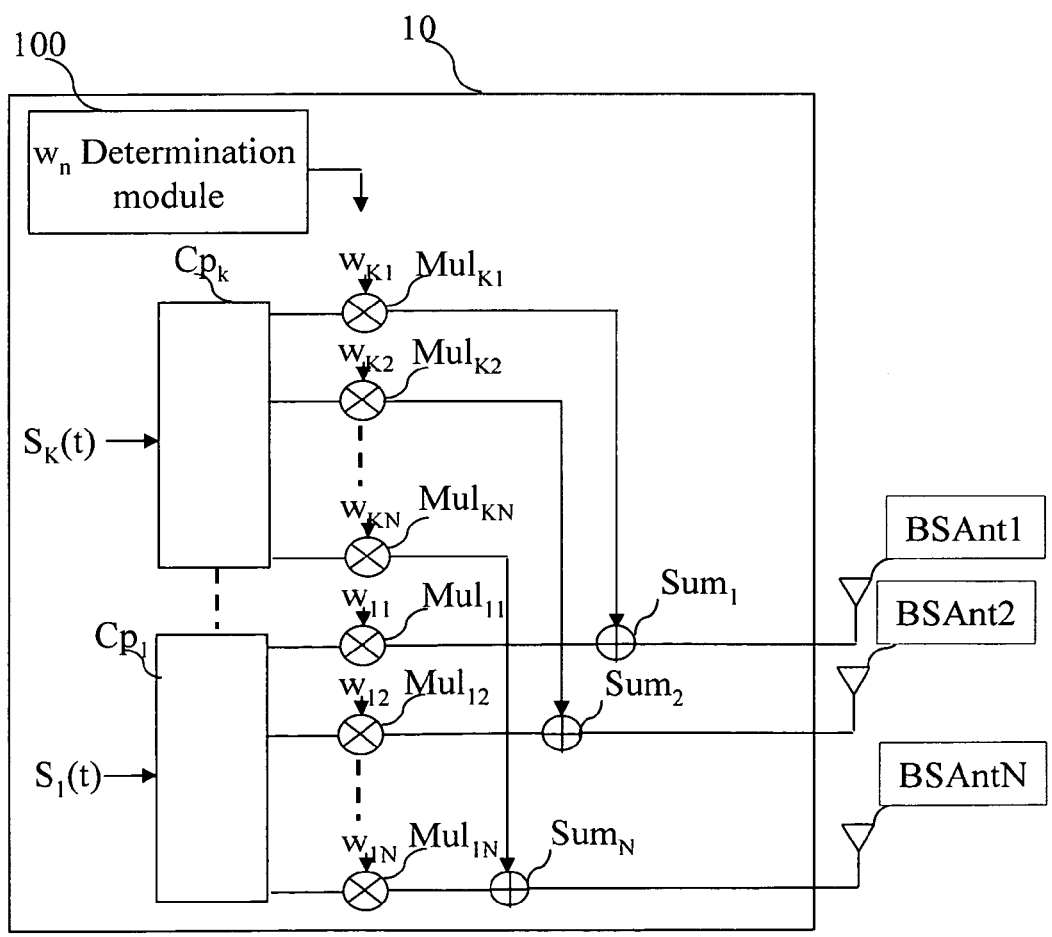
FIG. 2 is a diagram representing the architecture of a base station according to the present invention.

FIG. 2 is a diagram representing the architecture of a base station according to the present invention.

The base station 10 comprises a weighting vector determination module 100, K duplication modules noted $Cp_1$ to $CP_K$, N*K multiplication modules noted $Mul_{11}$ to $Mul_{KN}$ and N summation modules noted $Sum_1$ to $Sum_N$. K is equal to the number of mobile terminals linked the base station 10. It has to be noted here that K can be equal to 1 to N.

The signals $S_1(t)$ to $S_K(t)$ are the signals to be transferred to the K mobile terminals $20_1$ to $20_K$ linked to the base stations 10. Each of the signals $S_1(t)$ to $S_K(t)$ are N times duplicated by a respective duplication module $Cp_1$ to $CP_K$. For each signal to be transferred to a mobile terminal $20_k$ with k=1 to K, each duplicated signal is weighted by the elements of the weighting vector corresponding to the mobile terminal and determined by the weighting vector determination module 100. The combination of each signals transferred to a mobile terminal $20_k$ by the antennas BSkAnt1 to BSkAntM is called beamforming signal.

The signals weighted by the first element of each downlink weighting vector are then summed and transferred through the first antenna BSAnt1 of the base station 10. The signals weighted by the second element of each weighting vector are then summed and transferred through the second antenna BSAnt2 of the base station 10 and so on until the N-th elements of the weighting vectors.

It has to be noted here that the signals are prior to be transferred to each antennas, frequency up converted, mapped and so on, as it is done in classical wireless telecommunication devices.

According to the invention, the weighting vector determination module 100 determines the weighting vectors which are applied to the respective signals $S_1(t)$ to $S_K(t)$ to be transferred to the mobile terminals $20_1$ to $20_K$ and which are representative of the uplink weighting vectors each corresponding mobile terminal $20_1$ to $20_K$ has to use when it transfers signals to the base station 10 through the uplink channel.

Figure 3:
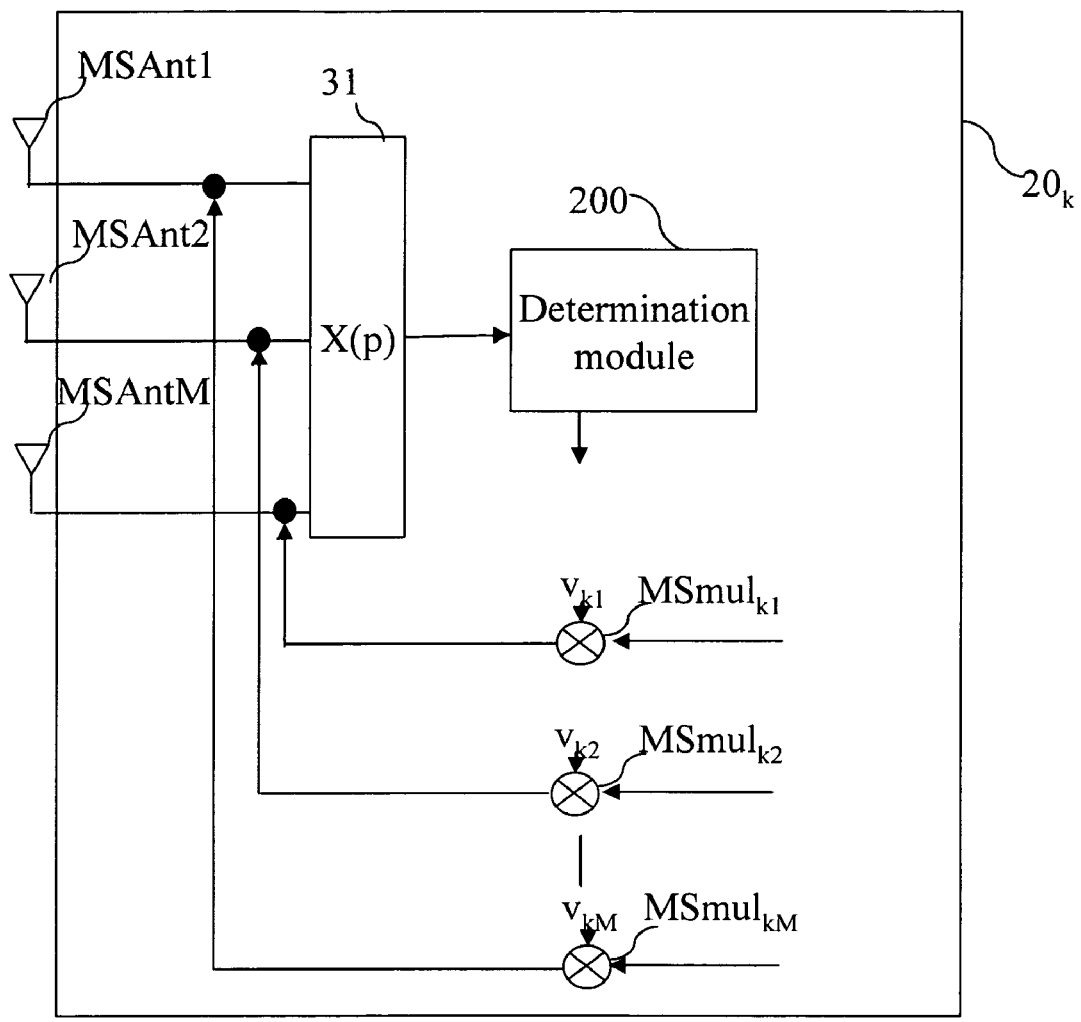
FIG. 3 is a diagram representing the architecture of a mobile terminal according to the present invention.

FIG. 3 is a diagram representing the architecture of a mobile terminal according to the present invention.

Each mobile terminal $20_1$ to $20_K$ comprises an uplink weighting vector determination module 200, a received vector module 31 and $M_k$ multiplication modules noted $Msmul_1$ to $MSmul_M$.

The signals received from each antenna MSkAnt1 to MSkAntM are transferred to the received vector module 31 which groups them to form a received vector $x(p)$ or a received matrix $X(p)$ constituted of plural received vectors.

It has to be noted here that the signals received from each antennas are prior to the transferred to the received vector module 31, frequency down converted demapped as it is done in classical wireless telecommunication devices.

The received vector $x(p)$ or the received matrix $X(p)$ is transferred to the uplink weighting vector determination module 200 which determines the uplink weighting vector which has to be applied to the signal SMS(t) to be transferred to the base station 10 through the uplink channel.

More precisely, the signal SMS(t) is duplicated into $M_k$ signals $SMS_1(t)$ to $SMS_M(t)$. Each duplicated signal $SMS_1(t)$ to $SMS_M(t)$ is weighted by the respective elements $v_{k1}$ to $v_{kM}$ of the weighting vector $v_k$ determined by the uplink weighting vector determination module 200. Each weighted duplicated signal $SMS_1(t)$ to $SMS_M(t)$ is transferred to the respective antennas MSkAnt1 to MSkAntM in order to form a beamforming signal.

It has to be noted here that the signals are prior to be transferred to each antennas, frequency up converting, mapped and so on as it is done in classical wireless telecommunication devices.

Let consider the theoretical bases of the present invention.

For the sake of simplicity, we first consider the case when only one mobile terminal $20_k$ is linked to the base station 10 and the mobile terminal $20_k$ knows the channel response matrix.

The uplink weighting vector determination module 100 determines the uplink weighting vector $w_k=[w_{k1}, \ldots, w_{kN}]^T$, wherein T denotes the transpose, N the number of antennas of the base station 10 and k refers to the mobile terminal $20_k$.

The signal $s_k(p)$ transferred by the base station 10 has an average signal power equals to 1, i.e $E[|s_k(p)|^2]=1$ and a power $P_s^{(k)}$.

The p-th sample of the received signal $x(p)=[x_1(p), \ldots, x_M(p)]^T$ by the mobile terminal $20_k$ is given by $$x(p) = \sum_{n=1}^{N} P_s^{(k)}(Hw_k)s_k(p) + z(p)$$

where H is the $M_k*N$ channel response matrix, $z(p)=[z_1(p), \ldots, z_M(p)]^T$ is the $M_k*1$ terminal interference plus noise vector.

The base station 10 obtains a channel response matrix H for the mobile terminal $20_k$.

As example and in a non limitative way, the mobile terminal $20_k$ transfers to the base station 10, different predefined pilot signals through the antennas BSAnt1 to BSAntN and the received pilot signals are processed by the base station 10 in order to determine the channel response matrix for the mobile terminal $20k$.

The mobile terminal $20_k$ weights the signals to be transferred to the base station 10 with an uplink weighting vector $\tilde{v}_k$ which is determined by the uplink weighting vector determination module 200 and which corresponds to an uplink weighting vector $v_k$ determined by the weighting vector determination module 100 as it will be disclosed latter. The power of the weighting vector is normalized, i.e. $\|\tilde{v}_k\|=1$.

The p-th sample of such transferred signal to the base station 10 is noted $r(p)$ and has a power $P_r$.

The p-th sample of the received signal $x_{BS}(p)$ at the base station 10 is given by:

$$x_{BS}(p)=\sqrt{P_r}H^T vr(p)+z_{BS}(p)$$

where $z_{BS}(p)$ is the base station 10 interference plus noise vector, $\sqrt{P_r}H^T vr(p)$ is the response vector on the uplink channel and $H^T$ is the transposed channel response matrix.

According to the present invention, the base station 10, more precisely the weighting vectors determination module 100, determines the uplink weighting vector $v_k$ that the mobile terminal $20_k$ has to use for weighting the signals transferred to the base station 10 and transfers to the mobile terminal $20_k$ information related to the determined uplink weighting vector $v_k$.

In a preferred mode of realization of the present invention, the base station 10 transfers information related to the determined uplink weighting vector $v_k$ to the mobile terminal $20_k$ by weighting the transferred signals to the mobile terminal $20_k$ by information related to the determined uplink weighting vector $v_k$.

More precisely, the weighting vectors determination module 100 calculates an intermediate vector $b=\sqrt{P_r}H^T v_k$ and determines a downlink weighting vector $w_k=b^*/\|b\|$ where b* denotes the complex conjugate of b.

It has to be noted here that the vector b is the response vector that the base station 10 expects to receive from the mobile terminal $20_k$ as far as it is composed of the uplink weighting vector $v_k$ and the transpose of the channel response matrix H.

The base station 10 uses, in a preferred mode of realization of the invention, a downlink time slot for transmitting pilot signals weighted by the determined downlink weighting vector $w_k$.

It has to be noted here that, in a variant of realization, the base station 10 transmits the uplink weighting vector $v_k$ or the downlink weighting vector $w_k$ to the mobile terminal $20_k$ by inserting it in time slots of the downlink channel which are classically used to transfer data.

According to the preferred mode of realization, the mobile terminal $20_k$ receives a received vector noted a which is equal to:

$$a = Hw_k = H\frac{b^*}{\|b\|} = \sqrt{P_r}HH^H\frac{v_k^*}{\|b\|}$$

Using the known channel information $HH^H$, the mobile terminal $20_k$ computes the uplink weighting vector $\tilde{v}_k$ as:

$$\tilde{v}_k = \frac{\{(HH^H)^+ a\}^*}{\|\{(HH^H)^+ a\}^*\|}$$

where $^+$ is the Moor-Penrose generalized matrix inverse $H^H$ denotes the complex conjugate transpose of H.

A Moore-Penrose generalized matrix inverse corresponds to:

$$\left(Q_0 \begin{bmatrix} \Delta & 0 \\ 0 & 0 \end{bmatrix} Q_0^H\right)^+ = Q_0 \begin{bmatrix} \Delta^{-1} & 0 \\ 0 & 0 \end{bmatrix} Q_0^H$$

where $Q_0$ is the $M_k*M_k$ unitary matrix and $\Delta$ is a m*m invertible matrix with $m \leq M$.

The uplink weighting vector $\tilde{v}_k$ is equal to the uplink weighting vector $v_k$ determined by the base station 10.

Indeed, let decompose the channel response matrix H in a singular value decomposition.

H is decomposed into $H=Q\Lambda U^H$ where $Q=[q_1, \ldots, q_M]$ is the $M_k*M_k$ unitary matrix, $U^H$ is the complex conjugate transpose of the matrix U, $U=[u_1, \ldots, u_N]$ is the N*N unitary matrix, $\Lambda=\text{diag}[\lambda_1, \lambda_2, \ldots, \lambda_{min(M,N)}]$ is the $M_k*N$ diagonal matrix and $\lambda_1 \geq \lambda_2 \geq \ldots \geq \lambda_{min(M,N)} \geq 0$.

The number of non zero real elements $\lambda_n$ is denoted d, that is $\lambda_d > 0$ and $\lambda_{d+1} = 0$.

The $M_k*1$ vector $v_k$ can be written as a linear combination of $q^*_1, \ldots, q^*_M$ wherein x* denotes the complex conjugate of x.

$$v_k = f_1 q^*_1 + \ldots + f_M q^*_M$$

Then, the expected response vector $b=\sqrt{P_r}H^T v_k$ can be expressed as:

$$b = \sqrt{P_r} U^* \Lambda^T Q^T v_k = \sqrt{P_r} \sum_{n=1}^{d} f_M \lambda_n u_n^*$$

It has to be noted here that, if $d<M$, the weighting vector $v_k$ which achieves the expected response vector b has a degree of freedom in $f_{d+1}, \ldots, f_M$.

Then, the proposed scheme chooses the weighting vector $v_k$ with $f_{d+1}=\ldots=f_M=0$. $v_k$ can then be restricted to a subspace as $v_k = f_1 q^*_1 + \ldots + f_d q^*_d$.

$(HH^H)$ can be rewritten as:

$$(HH^H)^* = Q^* \Psi (Q^*)^H$$

wherein $\Psi=\text{diag}[\lambda_1^2, \lambda_2^2, \ldots, \lambda_M^2]$ if $d=M_k$ or $\Psi=\text{diag}[\lambda_1^2, \lambda_2^2, \ldots, \lambda_d^2, 0, \ldots, 0]$ if $d<M_k$.

$\Psi$ is a $M_k*M_k$ diagonal matrix, $q^*_1, \ldots, q^*_d$ are the eigenvectors of $(HH^H)^*$ which have non zero eigenvalues.

Using the mathematical formula of the Moor-Penrose's generalized inverse, $(HH^H)^+$ is given by:

$$(HH^H)^+ = Q\Psi^- Q^H$$

wherein $\Psi^-=\text{diag}[\lambda_1^{-2}, \lambda_2^{-2}, \ldots, \lambda_M^{-2}]$ if $d=M_k$ or $\Psi=\text{diag}[\lambda_1^{-2}, \lambda_2^{-2}, \ldots, \lambda_d^{-2}, 0, \ldots, 0]$ if $d<M_k$.

Therefore, $\{(HH^H)^+ HH^H\}^* = \sum_{n=1}^{d} q_n^* q_n^T$.

And then $\{(HH^H)^+ HH^H\}^* v_k = v_k$ and $$\tilde{v}_k = \frac{\{(HH^H)^+ HH^H v_k^*\}^*}{\|\{(HH^H)^+ HH^+ v_k^*\}^*\|} = \frac{v_k}{\|v_k\|} = v_k.$$

Since $\tilde{v}_k = v_k$, the base station 10 can then instruct the proper uplink weighting vector $v_k$ to the mobile terminal $20_k$ through the downlink weighting vector $w_k$ and control the transfer of signals by a mobile terminal $20_k$.

Let consider now the case where only one mobile terminal $20_k$ is linked to the base station 10 and the mobile terminal $20_k$ is not aware of the channel information like $HH^H$.

In such case, the mobile terminal $20_k$ needs to estimate either the response vector a and the channel information $HH^H$.

In order to allow the mobile terminal $20_k$ to estimate the channel information $HH^H$, the base station 10 sends a plurality of pilot signals $S_n(p)$ with n=1 to N which are weighted using different downlink weighting vectors $w_1$ to $w_N$.

The vectors $w_1$ to $w_N$ are defined as mutually orthogonal, so $WW^H=I$ and $W=[w_1, \ldots, w_N]$.

Here, one of the $w_1$ to $w_N$ downlink weighting vector, is the downlink weighting vector $w_k$ determined for the mobile terminal $20_k$. That downlink weighting vector $w_k$ is equal to:

$$w_k = b^*/\|b\| \text{ with } b=\sqrt{P_r}H^T v_k.$$

The vector b is the response vector that the base station 10 expects to receive from the mobile terminal $20_k$.

Assuming that each transmitted signal by the base station 10 has a transmit power $P_s$, the received signal vector x(p) is equal to $$x(p) = \sum_{n=1}^{N} \sqrt{P_s}\, Hw_n s_n(p) + z(p).$$

The received signals for the sequence of the $1, \ldots, p_0$-th symbols are expressed in a matrix form as:

$$X=[x(1), \ldots, x(p_0)]=\sqrt{P_s}HWS+Z$$

It has to be noted here that, a pilot signal is composed of a sequence of symbols.

$$\text{with } S = \begin{bmatrix} s_1(1) & \cdots & \cdots & \cdots & s_1(p_0) \\ \cdots & \cdots & \cdots & \cdots & \cdots \\ s_N(1) & \cdots & \cdots & \cdots & s_N(p_0) \end{bmatrix},$$

$$Z=[z(1), \ldots, z(p_0)]$$

As the pilot signals are mutually orthogonals, $SS^H=p_0 I$.

The mobile terminal $20_k$ estimates the matrix A=HW and $a_n=Hw_n$ as:

$$\tilde{A} = \frac{1}{p_0} XS^H = \sqrt{P_s}\, HW + \frac{1}{p_0} ZS^H$$

$$\tilde{a}_k = \frac{1}{p_0} Xs_k^H = \sqrt{P_s}\, Hw_k + \frac{1}{p_0} Zs_k^H$$

where $$s_k = [s_k(1), \ldots, s_k(p_0)]$$

As $HH^H = HWW^H H^H$, the mobile terminal $20_k$ estimates the weighting vector $\tilde{v}_k$ as $$\tilde{v}_k = \frac{\{(\tilde{A}\tilde{A}^H)^+ \tilde{a}_k\}^*}{\|\{(\tilde{A}\tilde{A}^H)^+ \tilde{a}_k\}\|}$$

Thus, by transferring pilots symbols weighted by N orthogonal downlink weighting vectors $w_1$ to $w_N$, the base station 10 enables the mobile terminal $20_k$ to determine the uplink weighting vector $\tilde{v}_k$ and control the transfer of signals by the mobile terminal $20_k$.

Let consider now the case where K=N mobile terminals $20_1$ to $20_N$ are linked to the base station 10 and the mobile terminals $20_1$ to $20_N$ are not aware of the channel response matrix.

It is the case, for example, for Space Division Multiple Access, where the base station 10 needs to determine uplink weighting vectors $v_1$ to $v_K$ for K mobile terminals $20_1$ to $20_K$.

To meet this, the base station 10 determines the weighting vectors $v_1$ to $v_K$ for the respective mobile terminals $20_1$ to $20_K$, so that the base station 10 receives the expected response vectors $b_k = \sqrt{P_r} H_k^T v_k$, with k=1 to K from each of the respective mobile terminals $20_1$ to $20_K$.

The base station 10 determines the response vectors $b_k$ on the constraints that the matrix $B=[b_1/\|b_1\|, \ldots, b_N/\|b_N\|]$ is not a singular matrix, i.e. if the determinant of B is not equal to zero.

The base station 10 transfers the signals $S_1(t)$ to $S_N(t)$ which are formed of pilots signals. The signals $S_1(t)$ to $S_N(t)$ are respectively weighted by the uplink weighting vectors $w_1$ to $w_K$.

The weighting vectors $w_k$, for k=1 to K are equal, in such case, to:

$$w_k = (B^*B^T)^{-1} b^*_k / \|b_k\|$$

All the structures, such as the pilot signals and the terminal's weight computation method are similar as the one previously mentioned.

Consequently, the k-th mobile terminal $20_k$ estimates the matrix $A_k$ and $a_k$ as:

$$\tilde{A}_k = \frac{1}{p_0} XS^H = H_k W = H_k (B^*B^T)^{-1} B^* = H_k (B^T)^{-1}$$

$$\tilde{a}_k = \frac{1}{p_0} Xs_k^H = H_k (B^*B^T)^{-1} b_k^* / \|b_k\|$$

Where $H_k$ demotes the channel response matrix for a given mobile terminal $20_k$.

The k-th mobile terminal $20_k$ is then able to compute the uplink weighting vector $\tilde{v}_k$ using the following formula:

$$\tilde{v}_k = \frac{\{(\tilde{A}_k \tilde{A}_k^H)^+ \tilde{a}_k\}^*}{\|\{(\tilde{A}_k \tilde{A}_k^H)^+ \tilde{a}_k\}^*\|}$$

Using $H_{k0}=H_k(B^T)^{-1}$, $\{(\tilde{A}_k\tilde{A}_k^H)^+ \tilde{a}_k\}^*$ can be rewritten as:

$$\{(\tilde{A}_k\tilde{A}_k^H)^+ \tilde{a}_k\}^* = (\sqrt{P_r}/\|b_k\|)\{(H_{k0}H_{k0}^H)^+ H_{k0}H_{k0}^H\}^* v_k$$

Assuming that the weighting vector $\tilde{v}_k$ is restricted to the subspace of eigenvectors of $H_{k0}H_{k0}^H$ which correspond to non-zero eigenvalues, the same theoretical process as mentioned above leads to $\tilde{v}_k = v_k$.

Therefore, the base station 10 can define the K mobile terminals uplink weighting vectors $v_k$.

It has to be noted here that, the above control scheme is performed individually for different downlink weighting vectors $w_k$. It is also possible that a mobile terminal $20_k$ uses multiple uplink weighting vectors $v_k$ in order to transfer multiple data streams by using different downlink weighting vectors $v_k$.

It has also to be noted here that, when the number K of mobile terminals $20_1$ to $20_K$ is lower than the number N of antennas of the base station 10, the base station 10 chooses appropriate vectors $b_{K+1}, \ldots, b_N$.

For instance, $b_n$ (n=K+1, ..., N) is chosen to be orthogonal to the other predetermined vectors $b_1, \ldots, b_K$.

Using the vectors $b_1, \ldots, b_K$, the base station 10 determines the weighting vectors of the K mobile terminals, the vectors $b_{K+1}, \ldots, b_N$ are used for the estimation, by the mobile terminals $20_1$ to $20_K$ to estimate their matrix $H_k(B^T)^{-1}$.

Figure 4:
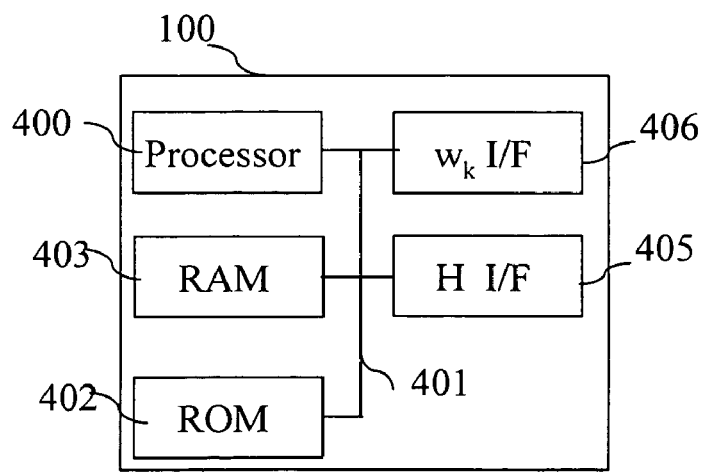
FIG. 4 is a diagram representing the architecture of the weighting vectors determination module of the base station according to the present invention.

FIG. 4 is a diagram representing the architecture of the weighting vectors determination module of the base station according to the present invention.

Figure 8:
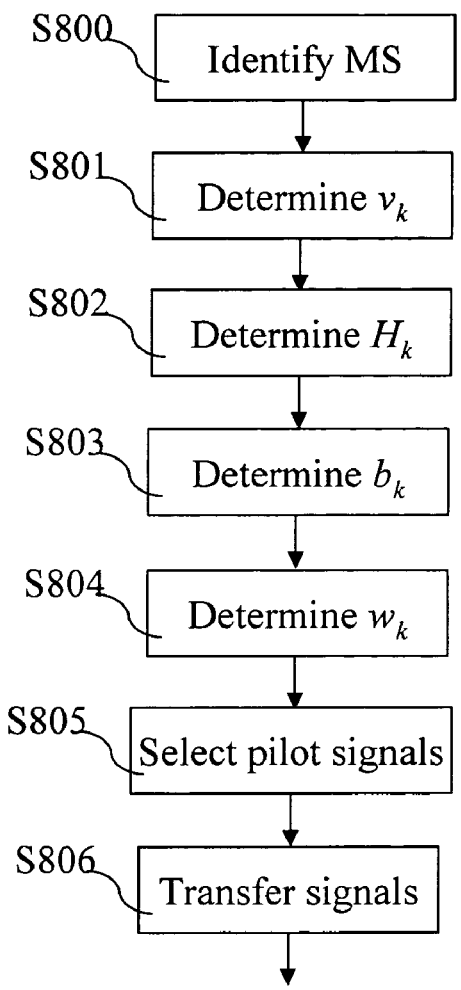
FIG. 8 is an algorithm executed by a base station for the determination of weighting vector of mobile stations and for transferring information related to the weighting vector.

The weighting vectors determination module 100 of the base station 10 has, for example, an architecture based on components connected together by a bus 401 and a processor 400 controlled by programs as disclosed in the FIG. 8.

The bus 401 links the processor 400 to a read only memory ROM 402, a random access memory RAM 403, a vector interface 406 and a channel interface 405.

The memory 403 contains registers intended to receive variables, and the instructions of the programs related to the algorithm as disclosed in the FIG. 8.

The processor 400 determines the weighting vectors $w_1$ to $w_k$ and $v_1$ to $v_k$. As example, the uplink weighting vectors $v_1$ to $v_k$ are determined considering interferences caused by the environment.

The read only memory 402 contains instructions of the programs related to the algorithm as disclosed in the FIG. 8 which are transferred, when the base station 10 is powered on to the random access memory 403.

The vector interface 406 permits the transfer of the elements $w_{11}$ to $w_{KN}$ of the determined downlink weighting vectors $w_1$ to $w_K$ to the respective multipliers $Mul_{11}$ to $Mul_{KN}$.

The channel interface 405 is adapted for receiving pilot signals from the mobile terminals $20_1$ to $20_K$ and to perform an estimation of the channel response matrix for each mobile terminals $20_1$ to $20_K$.

Figure 5:
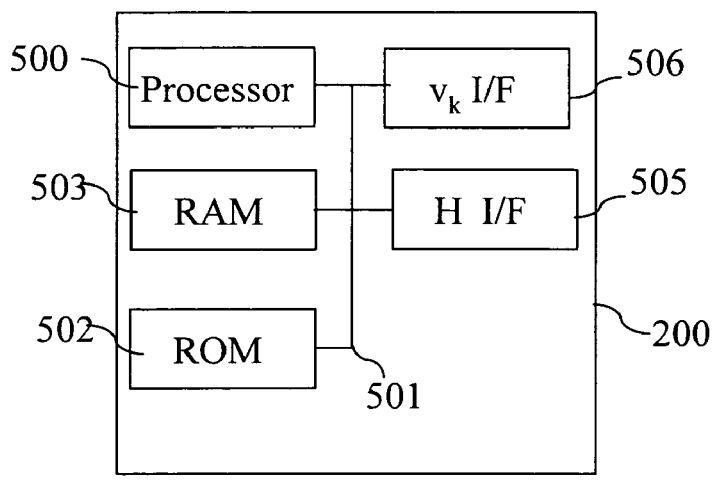
FIG. 5 is a diagram representing the architecture of the uplink weighting vectors determination module of a mobile terminal according to the present invention.

FIG. 5 is a diagram representing the architecture of the uplink weighting vectors determination module of a mobile terminal according to the present invention.

The uplink weighting vectors determination module 200 of a mobile terminal $20_k$ has, for example, an architecture based on components connected together by a bus 501 and a processor 500 controlled by programs as disclosed in the FIG. 5.

The bus 501 links the processor 500 to a read only memory ROM 502, a random access memory RAM 503, a vector interface 505.

Figure 9:
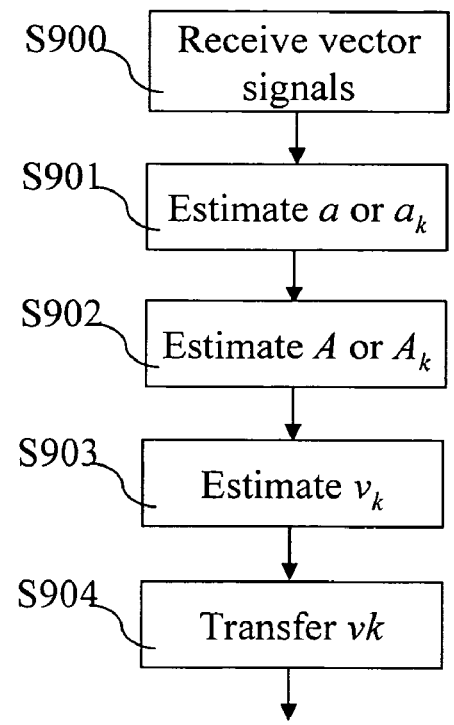
FIG. 9 is an algorithm executed by a mobile terminal station for the determination of a weighting vector from information received from the base station.

The memory 503 contains registers intended to receive variables and the instructions of the programs related to the algorithm as disclosed in the FIG. 9.

The processor 500 determines the uplink weighting vectors $v_1$ to $v_k$, as it will be disclosed in reference to the FIG. 9.

The read only memory 502 contains instructions of the programs related to the algorithm as disclosed in the FIG. 9 which are transferred, when the mobile terminal $20_k$ is powered on to the random access memory 503.

The vector interface 506 permits the transfer of the elements $v_{k1\ to\ vkN}$ of the determined uplink weighting vector $v_k$ to the respective multipliers $MSmul_{k1}$ to $MSmul_{kM}$.

Figure 6:
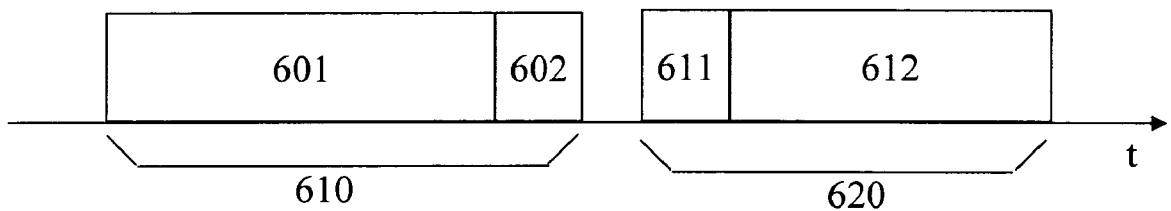
FIG. 6 is a diagram representing the uplink and downlink channels according to the present invention.

FIG. 6 is a diagram representing the uplink and downlink channels according to the present invention.

When the system uses Time Division Duplexing scheme, the signals transferred in the downlink channel 610 and the signals transferred in the uplink channels 620 are duplexed in different time periods of the same frequency band. The downlink channel 610 and the uplink channel 620 are divided into time slots. The downlink channel 610 comprises several time slots for transferring classical signals to the mobile terminals $20_1$ to $20_K$. Such time slots are grouped under the label 601. According to the invention one time slot 602 of the downlink channel 610 is an instruction time slot. The instruction time slot 602 will be described more precisely in reference to FIG. 7a.

The instruction timeslot 602 is preferably the last time slot of the downlink channel 600. As the instruction time slot is closed to the uplink channel 620, the channel variation are reduced.

The uplink channel 620 comprises several time slots for transferring classical signals to the base station 10. Such time slots are grouped under the label 612. In the FIG. 6, one time slot 611 of the uplink channel 620 is used as an identification time slot. The identification time slot 611 will be described more precisely in reference to FIG. 7b.

Figure 7A:
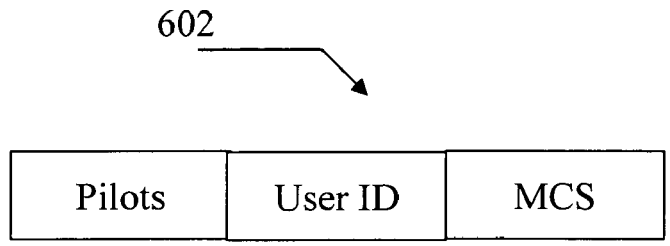
FIG. 7a is a diagram representing the instruction time slot comprised in the downlink channel according to the present invention.

FIGS. 7a is a diagram representing the instruction time slot comprised in the downlink channel according to the present invention.

The instruction time slot 602 comprised in the downlink channel 610 of the FIG. 6 comprises at least the pilot signals which are weighted by the uplink weighting vector $w_k$ related to the mobile terminal $20_k$ for which information comprised within the downlink channel 601 are transferred.

The instruction time slot 602 further comprises, in a variant of realization, a user ID which permits to identify the mobile terminal $20_k$ for which the instruction are transferred.

The instruction time slot 602 further comprises, in a variant of realization, the Modulation and Coding Scheme (MCS) to be used by the mobile terminal $20_k$ for which the instruction are transferred.

Figure 7B:
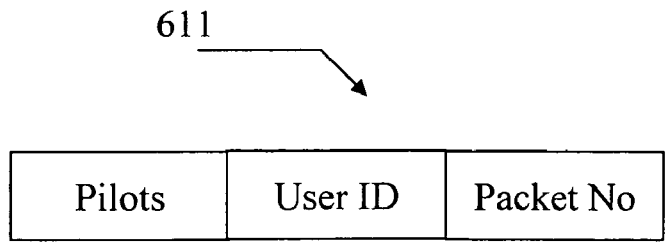
FIG. 7b is a diagram representing the identification time slot comprised in the uplink channel according to the present invention.

FIG. 7b is a diagram representing the identification time slot comprised in the uplink channel according to the present invention.

The identification time slot 611 comprised in the uplink channel 610 of the FIG. 6 comprises at least the pilot signals weighted by the uplink weighting coefficient $v_k$ and which are transferred to the base station 10. Such pilot signals are preferably equal to the one received by the mobile terminal $20k$ in the instruction time slot 602 previously described. By using the same pilot signals as the one used in the downlink channel and as far as pilot signals are different for each mobile terminal $20_1$ to $20_K$, it is then possible, for the base station 10, to determine which mobile terminal $20_1$ to $20_K$ sent the signals within the time slot.

The identification time slot 611 further comprises, in a variant of realization and when the transferred pilot signals are different from the one received from the base station 10, the user ID which permits the base station 10 to identify the mobile terminal $20_1$ to $20_K$ which sends the signals within the time slot.

The identification time slot 611 further comprises, in a variant of realization, information related to data comprised in the following packets like the packet number or information related to data previously received by the mobile terminal $20_1$ to $20_K$ like acknowledgement.

It has to be noted here that, the signals or information comprised in the identification time slot are, in a variant comprised in at least a header of a packet comprised in one of the time slots 612. In such variant, the identification time slot 611 is removed from the downlink channel.

FIG. 8 is an algorithm executed by a base station for the determination of weighting vector of mobile stations and for transferring information related to the weighting vector.

The algorithm of the FIG. 8 is more precisely executed by the processor 400 of the weighting vector determination module 100.

The processor 400 of the weighting vector determination module 100 executes on a periodical bases for each mobile terminal $20_1$ to $20_K$ which is linked to the base station 10.

At step S800, the processor 400 identify the mobile terminal 20k for which the present algorithm has to be executed.

At next step S801, the processor 400 determines the uplink weighting vector $v_k$ that the mobile terminal $20_k$ has to use for weighting the signals transferred to the base station 10.

As example and in a non limitative way, the base station 10 receives from the mobile terminal $20_k$ predefined pilot signals. The base station 10 determines the uplink weighting vector $v_k$ according to interferences caused by the environment.

At next step S802, the processor 400 determines the channel response matrix for the mobile terminal $20_k$. The channel response matrix noted H or $H_k$ for the mobile terminal $20_k$ is determined, as example, from the pilot signals received from the mobile terminal $20_k$.

At next step S803, the processor 400 determines the expected response vectors $b_k=\sqrt{P_r}H^T v_k$, to be received latter on from the mobile terminal $20_k$.

When a plurality of mobile terminals $20_1$ to $20_K$ are linked to the base station 10, the processor 400 determines the response vector $b_k$ on the constraints that the matrix $B=[b_1/\|b_1\|, \ldots, b_N/\|b_N\|]$ is not a singular matrix, At next step S804, the processor 400 determines the weighting vector $w_k$ for the mobile terminal $20_k$.

When a plurality of mobile terminals $20_1$ to $20_K$ are linked to the base station 10, the processor 400 determines $w_k$ using the following formula:

$$w_k=(B^*B^T)^{-1}b^*_k/\|b_k\|$$

When a single mobile terminal $20_k$ is linked to the base station 10, the processor 400 determines $w_k$ using the following formula:

$$w_k=b^*_k/\|b_k\|$$

At next step S805, the processor 400 selects some pilots signals for the mobile terminal $20_k$. According to a preferred mode of realisation of the present invention, the pilot signals transferred to each mobile terminals $20_1$ to $20_K$ are different from each other.

At next step S806, the pilot signals are selected as being the signals $S_1(t)$ to $S_K(t)$ which are N times duplicated by a respective duplication module $Cp_1$ to $CP_K$, weighted by the elements of the downlink weighting vector $w_k$, summed and transferred through the respective antennas BSAnt1 to BSAntN.

It has to be noted here that, when the mobile terminal $20_k$ is not aware of the channel information like $HH^H$ response matrix, the base station 10 sends a plurality of pilot signals $s_n(p)$ with n=1 to N which are weighted using different downlink weighting vectors $w_1$ to $w_N$.

The vectors $w_1$ to $w_N$ are defined as mutually orthogonal, so $WW^H=I$ and $W=[w_1, \ldots, w_N]$. One of the $w_1$ to $w_N$ downlink weighting vectors, is the downlink weighting vector $w_k$ determined for the mobile terminal $20_k$.

The weighted pilot signals are then transferred through the downlink channel. Preferably, the weighted pilots signals and the information described in reference to the FIG. 7a are transferred through the instruction time slot 602.

The processor 400 return then to the step S800.

FIG. 9 is an algorithm executed by a mobile terminal station for the determination of a weighting vector from information received from the base station.

The algorithm of the FIG. 9 is more precisely executed by the processor 500 of the weighting vector determination module 200.

At step S900, the received signal vectors are formed by the received vector module 31 and transferred to the weighting vector determination module 200.

When only one mobile terminal $20_k$ is linked to the base station 10 and the mobile terminal $20_k$ knows the channel response matrix vector H, a single received vector is transferred and is equal to:

$$a=Hw_k=Hb^*/\|b\|=\sqrt{P_r}HH^Hv_k^*/\|b\|$$

In Such case the processor 500 moves then to the step S903.

When one mobile terminal $20_k$ is linked to the base station 10 and the mobile terminal $20_k$ is not aware of the channel information like $HH^H$ or plural mobile terminals $20_1$ to $20_K$ are linked to the base station 10, the received vectors for the sequence of the $1, \ldots, p_0$-th symbols are expressed in a matrix form as:

$$X=[x(1), \ldots, x(p_0)]=\sqrt{P_s}HWS+Z$$

with $S = \begin{bmatrix} s_1(1) & \cdots & \cdots & \cdots & s_1(p_0) \\ \cdots & \cdots & \cdots & \cdots & \cdots \\ s_N(1) & \cdots & \cdots & \cdots & s_N(p_0) \end{bmatrix}$, $Z=[z(1), \ldots, z(p_0)]$ At next step S901, if one mobile terminal $20_k$ is linked to the base station 10, the processor 500 estimates the matrix $$\tilde{a}_k = \frac{1}{p_0}Xs_k^H = \sqrt{P_s}Hw_k + \frac{1}{p_0}Zs_k^H$$

where $s_k=[s_k(1), \ldots, s_k(p_0)]$

If plural mobile terminals $20_1$ to $20_K$ are linked to the base station 10, the processor 500 estimates the matrix $\tilde{a}_k=H_k(B^*B^T)^{-1}b^*_k/\|b_k\|$ At next step S902, if one mobile terminal $20_k$ is linked to the base station 10, the processor 500 estimates the matrix $$\tilde{A} = \frac{1}{p_0}XS^H = \sqrt{P_s}HW + \frac{1}{p_0}ZS^H.$$

If plural mobile terminals $20_1$ to $20_K$ are linked to the base station 10, the processor 500 estimates the matrix $\tilde{A}_k=H_kW=H_k(B^*B^T)^{-1}B^*$.

At next step S903, the processor 500 estimates the uplink weighting vector $\tilde{v}_k$.

When only one mobile terminal $20_k$ is linked to the base station 10 and the mobile terminal $20_k$ knows the channel response matrix vector H, the uplink weighting vector $\tilde{v}_k$ is equal to $$\tilde{v}_k = \frac{\{(HH^H)^+ a\}^*}{\|\{(HH^H)^+ a\}^*\|}.$$

if one mobile terminal $20_k$ is linked to the base station 10, the uplink weighting vector $\tilde{v}_k$ is equal to $$\tilde{v}_k = \frac{\{(\tilde{A}\tilde{A}^H)^+ \tilde{a}_k\}^*}{\|\{(\tilde{A}\tilde{A}^H)^+ \tilde{a}_k\}\|}.$$

If plural mobile terminals $20_1$ to $20_K$ are linked to the base station 10, the uplink weighting vector $\tilde{v}_k$ is equal to $$\tilde{v}_k = \frac{\{(\tilde{A}_k\tilde{A}_k^H)^+ \tilde{a}_k\}^*}{\|\{(\tilde{A}_k\tilde{A}_k^H)^+ \tilde{a}_k\}^*\|}.$$

At step S904, the elements of the uplink weighting vector $\tilde{v}_k$ are transferred. The signal SMS(t) to be transferred to the base station 10 is duplicated into $M_k$ signals $SMS_1(t)$ to $SMS_M(t)$. Each duplicated signal $SMS_1(t)$ to $SMS_M(t)$ is weighted by the respective elements $v_{k1}$ to $v_{kM}$ of the weighting vector $v_k$ determined by the uplink weighting vector determination module 200. Each weighted duplicated signal $SMS_1$ (t) to $SMS_M(t)$ is transferred to the respective antennas MSkAnt1 to MSkAntM in order to form a beamforming signal.

In a preferred mode of realization, the weighted duplicated signal $SMS_1(t)$ to $SMS_M(t)$ are pilot signals which are transferred through the uplink channel. Preferably, the weighted pilots signals and the information described in reference to the FIG. 7b are transferred through the information time slot 611.

The processor 500 return then to step S900 in order to process new received vectors.

The present invention has been described in the case of Time Division Duplexing scheme. It has to be noted that the invention is also applicable to Frequency Division Duplexing, allowing some control error due to different channel matrix between uplink and downlink channels.

The present invention is also applicable when a mobile terminal $20_k$ is able to compute the weighting vector $\tilde{v}$ based on conventional MMSE weight computation method.

For this, we consider the correlation matrix R of the received signal which is equal to $R=XX^H/p_0$ Such formulation can be transformed as:

$$R = \frac{1}{p_0}(\sqrt{P_s}\,HWS + Z)(\sqrt{P_s}\,HWS + Z)^H$$

$$R = P_s HH^H + \frac{\sqrt{P_s}}{p_0}\{HWSZ^H + (HWSZ^H)^H\} + \frac{1}{p_0}ZZ^H$$

$$R = \tilde{A}\tilde{A}^H + E$$

where $$E = \frac{1}{p_0}Z\left(I - \frac{1}{p_0}S^H S\right)Z^H$$

Allowing the weight error due to the error matrix E, we can replace $\tilde{A}\tilde{A}^H$ in the previous mentioned formulas by R. Thus $\tilde{v}$ is then given by:

$$\tilde{v}_k = \frac{\{R^{-1}\tilde{a}_k\}^*}{\|\{R^{-1}\tilde{a}_k\}^*\|}$$

Since R is usually non-singular and invertible, we used the relationship of $R^+=R^{-1}$ in the above equation.

$\tilde{v}_k$ corresponds to the conventional Minimum Mean Squared Error (MMSE) weight computation method.

In addition, since the zero-forcing (ZF) weight computation method has close solution to the MMSE weight computation, the mobile terminal $20_k$ is able to compute the weighting vector $\tilde{v}$ based on conventional ZF computation method.

Of course, the present invention is applicable not only in mobile communication systems or multi-point to point systems, but also in wireless local area networks or point-to-point wireless communication systems.

Naturally, many modifications can be made to the embodiments of the invention described above without departing from the scope of the present invention.

The invention claimed is:

1. A method for controlling a transfer of signals by a first communication device to a second communication device through a wireless network, the second communication device having at least N antennas where N is equal to or greater than two, the first communication device having at least $M_k$ antennas where $M_k$ is equal to or greater than two, the method comprising:

determining a weighting vector $v_k$, where k is an indicia representative of the first communication device, the weighting vector $v_k$ being composed of $M_k$ elements, each element of the weighting vector $v_k$ being expected to weight the signals transferred by the first communication device through an antenna of the first communication device;

determining, with the second communication device, a second weighting vector $w_k$, based on $\sqrt{P_r}H^T V_k$, $P_r$ being a power of a signal transferred by the first communication device to the second communication device, $H^T$ being a transpose of a channel response matrix H; and transferring to the first communication device through the wireless network at least a signal comprising or being weighted by the second weighting vector $w_k$.

2. The method according to claim 1, wherein the second weighting vector $w_k$ is composed of N elements, and each element of the second weighting vector $w_k$ weights pilot signals transferred through an antenna of the second communication device to the first communication device.

3. The method according to claim 2, wherein the second weighting vector $w_k=b^*/\|b\|$, wherein $b=\sqrt{P_r}H^T v_k$.

4. The method according to claim 2, wherein the second communication device transfers through the wireless network plural pilot signals weighted by plural second weighting vectors $w_k$ defined as mutually orthogonal or the plural pilot signals weighted by second weighting vectors $w_k$ are mutually orthogonal.

5. The method according to claim 4, wherein K first communication devices are linked to the second communication device, wherein K is equal to or greater than two, the plural pilot signals are mutually orthogonal and are weighted by different second weighting vectors $w_1$ to $w_K$, and the second weighting vectors $w_k$ for k=1 to K are equal to $w_k=(B^* B^T)^{-1}b^*_k/\|b_k\|$, wherein $B=[b_1/\|b_1\|, \ldots, b_k/\|b_k\|]$ is not a singular matrix, $b_k=\sqrt{P_r}H_k^T v_k$, $P_r$ is a power of a signal transferred by the kth first communication device to the second communication device, and $H_k^T$ is a transpose of a channel response matrix related to the kth first communication device.

6. The method according to any of claims 1 to 5, wherein the signals weighted by the determined weighting vector $w_k$ are comprised in an instruction time slot.

7. The method according to claim 6, wherein the instruction time slot further comprises a first communication identifier or a modulation and coding scheme to be used by the first communication device.

8. A memory encoded with a computer program which can be directly loadable into a programmable device, said computer program comprising instructions or portions of code for implementing the method according to claim 7, when said computer program is executed on the programmable device.

9. A memory encoded with a computer program which can be directly loadable into a programmable device, said computer program comprising instructions or portions of code for implementing the method according to claim 6, when said computer program is executed on the programmable device.

10. A memory encoded with a computer program which can be directly loadable into a programmable device, said computer program comprising instructions or portions of code for implementing the method according to any of claims 1 to 5, when said computer program is executed on the programmable device.

11. A method for transferring signals from a first communication device to a second communication device through a wireless network, the second communication device having at least N antennas where N is equal to or greater than two, the first communication device having at least $M_k$ antennas where $M_k$ is equal to or greater than two, the method comprising:

receiving at least a signal from the second communication device through the $M_k$ antennas;

determining, with the first communication device and based on $\{(HH^H)^+a\}^*$, from the at least one received signal a weighing vector $\tilde{v}_k$ composed of $M_k$ elements, $^+$ being a Moore-Penrose generalized matrix inverse, a being a received vector by the first communication device, H being a channel response matrix, $H^H$ being a complex conjugate transpose of the channel response matrix H; and weighting the signals transferred to the second communication device through each antenna of the first communication device by an element of the determined weighing vector $\tilde{v}_k$.

12. The method according to claim 11, wherein the signal received from the second communication device through the $M_k$ antennas is a pilot signal.

13. The method according to claim 12, wherein the weighing vector $\tilde{v}_k$ is equal to $$\tilde{v}_k = \frac{\{(HH^H)^+a\}^*}{\|\{(HH^H)^+a\}^*\|},$$

14. The method according to claim 13, wherein plural signals are received and are representative of a sequence of $p_0$ symbols, and a determination of the weighing vector $\tilde{v}_k$ includes:

calculating a first $$\text{matrix } \tilde{A} = \frac{1}{p_0}XS^H, \quad X = [x(1), \ldots, x(p_0)],$$

$x(p) = [x_1(p), \ldots, x_{Mk}(p)]^T$ is a received signal of a p-th symbol, $$S = \begin{bmatrix} s_1(1) & \ldots & \ldots & \ldots & s_1(p_0) \\ \ldots & \ldots & \ldots & \ldots & \ldots \\ s_N(1) & \ldots & \ldots & \ldots & s_N(p_0) \end{bmatrix},$$

calculating a second matrix $\tilde{a}_k = 1/p_0 X s_k^H$ where $s_k = [s_k(1), \ldots, s_k(p_0)]$, calculating the weighing vector $$\tilde{v}_k = \frac{\{(\tilde{A}\tilde{A}^H)^+\tilde{a}_k\}^*}{\|\{(\tilde{A}\tilde{A}^H)^+\tilde{a}_k\}\|},$$

where $^+$ is the Moore-Penrose generalized matrix inverse, $\tilde{A}^H$ is a complex conjugate transpose of the first matrix $\tilde{A}$.

15. The method according to any of claims 12 to 14, wherein the weighted signals transferred are pilot signals received from the second communication device through the $M_k$ antennas, and the weighted signals transferred are comprised in an identification time slot.

16. The method according to claim 15, wherein the identification time slot further comprises a first communication device identifier.

17. A memory encoded with a computer program which can be directly loadable into a programmable device, said computer program comprising instructions or portions of code for implementing the method according to claim 16, when said computer program is executed on the programmable device.

18. A memory encoded with a computer program which can be directly loadable into a programmable device, said computer program comprising instructions or portions of code for implementing the method according to claim 15, when said computer program is executed on the programmable device.

19. A memory encoded with a computer program which can be directly loadable into a programmable device, said computer program comprising instructions or portions of code for implementing the method according to any of claims 11 to 14, when said computer program is executed on the programmable device.

20. A device for controlling a transfer of signals by a first communication device to a second communication device through a wireless network, the second communication device having at least N antennas where N is equal to or greater than two, the first communication device having at least $M_k$ antennas where $M_k$ is equal to or greater than two, the device for controlling the transfer being included in the second communication device and comprising:

a processing unit configured to determine a weighting vector $v_k$, where k is an indicia representative of the first communication device, the weighting vector $v_k$ being composed of $M_k$ elements, each element of the weighting vector $v_k$ being expected to weight the signals transferred by the first communication device through an antenna of the first communication device, the processing unit being further configured to determine a second weighting vector $w_k$, based on $\sqrt{P_r}H^Tv_k$, $P_r$ being a power of a signal transferred by the first communication device to the second communication device, $H^T$ being a transpose of a channel response matrix H; and an antenna configured to transfer to the first communication device through the wireless network at least a signal comprising or being modified by the second weighting vector $w_k$.

21. A device for transferring signals by a first communication device to a second communication device through a wireless network, the second communication device having at least N antennas where N is equal to or greater than two, the first communication device having at least $M_k$ antennas where $M_k$ is equal to or greater than two, the device for transferring signals being included in the first communication device and comprising:

a processor configured to receive at least a signal from the second communication device through the $M_k$ antennas, the processor being further configured to determine, based on $\{(HH^H)^+a\}^*$, from the at least one received signal a weighing vector $\tilde{v}_k$ composed of $M_k$ elements, $^+$ being a Moore-Penrose generalized matrix inverse, a being a received vector by the first communication device, H being a channel response matrix, $H^H$ being a complex conjugate transpose of the channel response matrix H, the processor being further configured to weight the signals transferred to the second communication device through each antenna of the first communication device by an element of the determined weighing vector $\tilde{v}_k$.

22. A device that transfers a signal for controlling a transfer of signals by a first communication device to the device through a wireless network, the device being a second communication device having at least N antennas where N is equal to or greater than two, the first communication device having at least $M_k$ antennas where $M_k$ is equal to or greater than two, wherein the signal comprises pilot symbols weighted by a weighting vector $w_k$ obtained from a weighting vector $v_k$, based on $\sqrt{P_r}H^T v_k$, $P_r$ being a power of a signal transferred by the first communication device to the second communication device, $H^T$ being a transpose of a channel response matrix H, where k is an indicia representative of the first communication device, the weighting vector $v_k$ being composed of $M_k$ elements, each element of the weighting vector $v_k$ being expected to weight the signals transferred by the first communication device through an antenna of the first communication device.

* * * * *